(No Model.)
J. WALKER.
FRICTION CLUTCH.
No. 434,122. Patented Aug. 12, 1890.
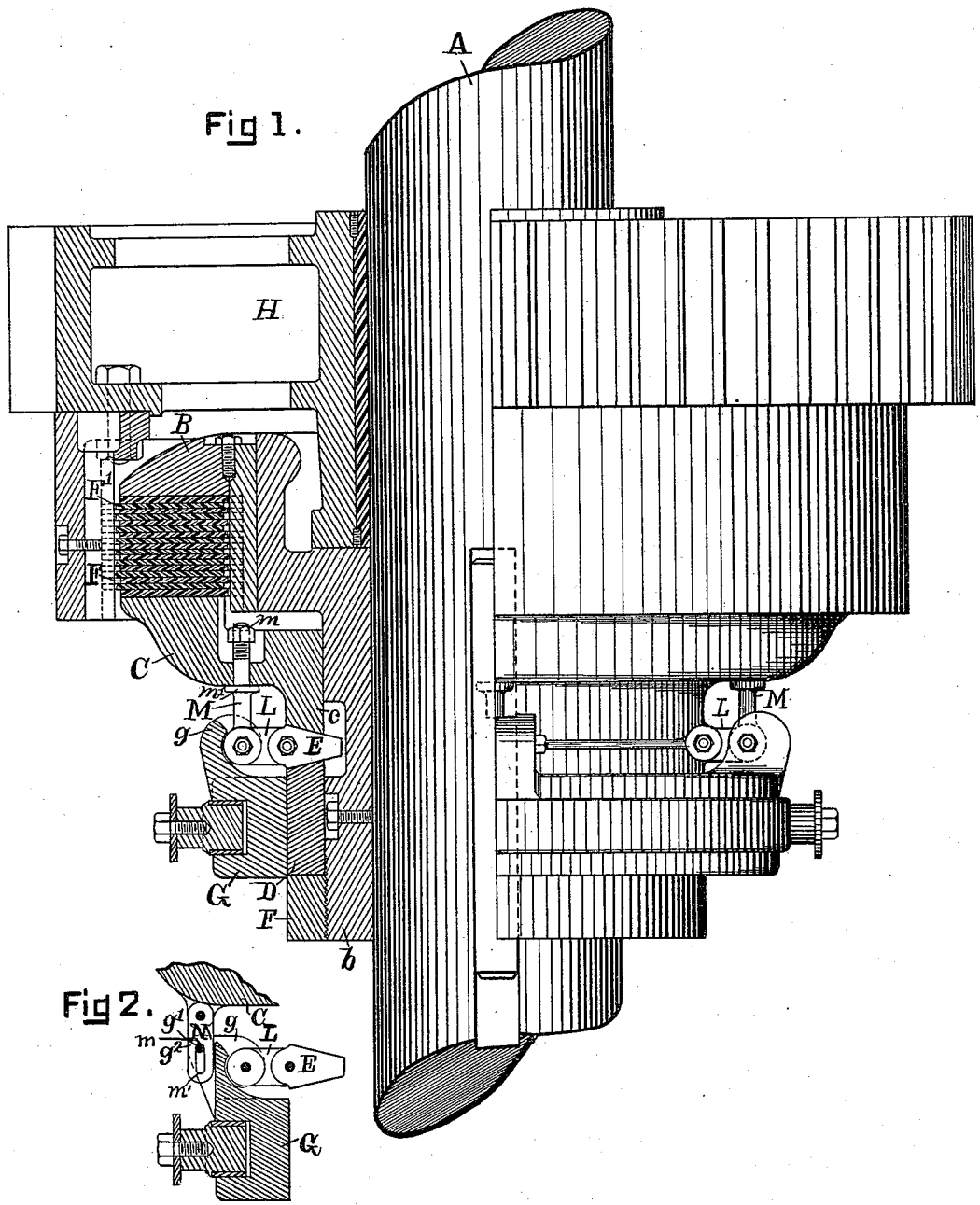
WITNESSES.
Frank. M. Giller.
Albert H. Bates.
INVENTOR.
John Walker
By his attorneys
Watson + Thurston

UNITED STATES PATENT OFFICE.

JOHN WALKER, OF CLEVELAND, OHIO.

FRICTION-CLUTCH.

SPECIFICATION forming part of Letters Patent No. 434,122, dated August 12, 1890.

Application filed May 8, 1890. Serial No. 351,025. (No model.)

*To all whom it may concern:*

Be it known that I, JOHN WALKER, a citizen of the United States, residing at Cleveland, in the county of Cuyahoga and State of Ohio, have invented certain new and useful Improvements in Friction Clutches and Couplings, of which the following is such a full, clear, and exact description as will enable others skilled in the art to which it appertains to make and use the same.

My invention relates to that class of friction clutches or couplings in which a movable friction member is caused to slide lengthwise of the shaft upon which it is mounted toward a stationary friction member for the purpose of frictionally engaging the two members or of grasping between them an interposed drum, disk, or series of disks.

Several modifications of this class of clutches are shown in Letters Patent, No. 75,227, granted March 3, 1868, to T. A. Weston; No. 236,814, granted January 18, 1881, to R. H. Hill, and No. 424,631, granted April 1, 1890, to myself, and numerous other patents. The last-named patent shows more clearly than do the others the particular form of clutch to which the invention herein claimed may be most advantageously applied, said clutch being one in which two series of disks, alternately secured to independently revoluble parts, are brought into frictional engagement by being pressed between two pressure-flanges by appropriate mechanism, whereby a community of state is produced between the two parts to which said disks are respectively connected, whether that state be one of rest or motion, and in which the mechanism provided for thrusting the movable pressure-flange toward the stationary pressure-flange to produce this frictional engagement is not adapted to positively move said flange in a reverse direction for the purpose of permitting the friction-surfaces to become disengaged.

The object of my invention is to provide novel mechanism whereby the movable friction member is positively drawn backward during the backward movement of the shifting sleeve.

My invention consists, primarily, in the combination of a longitudinally-movable pressure-flange, a shifting sleeve, and a link connecting them, one of the connections being loose, whereby the link slides freely upon that part to which it is loosely connected during any forward motion of the sleeve, said link being provided with a shoulder adapted to engage with the part to which it is loosely connected during the backward movement of said shifting sleeve, whereby the flange is drawn positively backward.

It also consists in the construction, combination, and arrangement of the parts herein described, which are definitely pointed out in the claims.

Referring to the drawings, Figure 1 is a side elevation of what I regard as the best embodiment of my invention, the upper half of said clutch being shown in central vertical section. Fig. 2 is a view of a modified form of link and the means for connecting it with the shifting sleeve and movable member.

Referring to the parts by letter, A represents the shaft, upon which is loosely mounted a driving-gear H, which the clutching mechanism is designed to connect with the shaft at will.

B represents the stationary friction member, and C the movable friction member. In the form shown these friction members are in the form of disk-like flanges, which are parts of sleeves or hubs which are mounted on the shaft A. Therefore during the following detail description of the device I shall refer to these friction members as "pressure-flanges." The pressure-flange B is a part of a long hub $b$, which is keyed or otherwise secured to the shaft A. The pressure-flange C is a part of a sleeve $c$, which surrounds the hub $b$, and said hub and sleeve are connected by a spline or some other analogous connection, which compels both to revolve together, but which permits the sleeve to slide lengthwise of the shaft on said hub. A collar D surrounds the hub and is rigid therewith during the operation of the parts. A spline or other equivalent connection between the collar and hub prevents their relative revolution, and a nut F, which screws onto the hub, furnishes means for adjusting the position of the collar D and for holding it in that position. A shifting sleeve G surrounds the collar D, and suitable connecting mechanism— as, for example, a spline—is provided, which compels their concurrent revolution, but permits the sleeve G to slide longitudinally. Mechanism is also provided whereby the sleeve c may be thrust away from the collar D, and this mechanism is adapted to be operated by the shifting sleeve G. The form of this operating mechanism shown is substantially such as is shown in my patent No. 424,631, which consists of wedges E interposed at suitable intervals between the proximate faces of the collar D and sleeve c. Each of these wedges is connected by a free swinging link L with overhanging ears g on the sliding sleeve, whereby when the sleeve G is moved forward the wedges are moved toward the axis of the shaft, thereby moving the sleeve c from the collar D, or, in other words, moving the pressure-flange C toward the flange B. This movement forces the disks F F' into frictional engagement and produces a community of state between the two relatively movable parts H and b, to which said disks are connected in a well-known manner. The reverse movement of the sleeve withdraws the wedges, which simply relieves the pressure against the sleeve c and permits the friction-surfaces to disengage themselves sufficiently to permit the parts to which said surfaces are secured to move independently.

M M represent links, which are secured to the shifting sleeve G, and in the construction shown in Fig. 1 by the same pivots which secure the links L thereto. The free end of each link passes through the flange C. Near the end of each link is a shoulder, (shown in the form of a nut m,) which is adapted to engage with the inside of said flange, as hereinafter explained. On the link at the proper point outside the flange C is a shoulder m', which is also adapted to engage with the flange C, and thereby limit the forward movement of the shifting sleeve. When the shifting sleeve is drawn backward, the wedges are withdrawn. While this is being done the links M slide freely through the holes in the flange until the shoulders m strike said flange C, when the flange is drawn backward at the same rate that the sleeve moves. This movement is more rapid than that of the wedge, and the sleeve c is soon drawn against the wedge. This prevents any rattling of the parts, and also places the sleeve c in a position where it will begin its forward movement as soon as the wedges are moved inward by the shifting sleeve. When the flange C is thus positively drawn back, it is obvious that the friction-surfaces will separate more rapidly and completely than they otherwise would, and that consequently there will be less wear upon them.

In the modified form of the invention shown in Fig. 2 the links are connected at one end to the flange C. The other end of the links is slotted, and pins $g'$, which are secured to the ears $g^2$ on the sleeve G, pass through these slots. When the sleeve G moves forward, the forward end of the slot in the link is struck by the pin $g'$ and the forward movement of the sleeve arrested. When the sleeve G is moved in the releasing direction, the pin $g'$ slides in the slot until it strikes the rear end of said slot, when the flange is positively drawn backward, as before explained.

Having thus described my invention, what I claim as new, and desire to secure by Letters Patent, is—

1. In a friction-clutch, in combination, a longitudinally-movable pressure-flange, a shifting sleeve, and a link which is connected with both of said parts, one of said connections being a loose connection, said link being provided with a shoulder adapted to engage with the part to which it is loosely connected during the backward movement of the shifting sleeve, substantially as and for the purpose specified.

2. In a friction-clutch, in combination, a longitudinally-movable pressure-flange, a shifting sleeve, and a link which is connected with both the flange and sleeve, the connection with one of them being by means which permits a relative sliding movement during the forward movement of the sleeve, said link being provided with two shoulders adapted to engage one on one side and the other on the other side of the part to which said link is loosely connected, substantially as and for the purpose specified.

3. In a friction-clutch, in combination, a longitudinally-movable pressure-flange, a shifting sleeve, a link connected with the sleeve and passing loosely through said flange, and two shoulders on said link, one on one side and the other on the other side of said flange, substantially as and for the purpose specified.

4. In a friction-clutch, the combination of a longitudinally-movable pressure-flange, a collar fixed to the shaft, said collar and flange being provided with oppositely-inclined proximate surfaces, wedges adapted to engage with said oppositely-inclined surfaces, a shifting sleeve, and suitable connections between said sleeve and wedges with a link connected with said sleeve and pressure-flange, one of said connections being a loose connection, and a shoulder on said link adapted to engage with the part to which it is loosely connected during the backward movement of said sleeve, substantially as and for the purpose specified.

JOHN WALKER.

Witnesses:
E. L. THURSTON,
ALBERT H. BATES.